US012589737B2

(12) United States Patent
Bialer et al.

(10) Patent No.: US 12,589,737 B2
(45) Date of Patent: Mar. 31, 2026

(54) VEHICLE SYSTEMS AND METHODS FOR PEDESTRIAN ROAD CROSSING PREDICTIONS

(71) Applicant: GM GLOBAL TECHNOLOGY OPERATIONS LLC, Detroit, MI (US)

(72) Inventors: Oded Bialer, Petach Tikva (IL); Roy Uziel, Givatayim (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 148 days.

(21) Appl. No.: 18/402,834

(22) Filed: Jan. 3, 2024

(65) Prior Publication Data

US 2025/0214569 A1     Jul. 3, 2025

(51) Int. Cl.
B60W 30/09     (2012.01)
B60W 10/18     (2012.01)
(Continued)

(52) U.S. Cl.
CPC ............ B60W 30/09 (2013.01); B60W 10/18 (2013.01); B60W 30/0956 (2013.01);
(Continued)

(58) Field of Classification Search
CPC .. B60W 30/09; B60W 10/18; B60W 30/0956; B60W 50/0097; B60W 50/14; B60W 2554/4029; B60W 2554/4045; B60W 2050/146; B60W 2420/403; G06T 7/10; G06T 7/70; G06T 2207/20081; G06T 2207/30196; G06T 2207/30252;
(Continued)

(56) References Cited

U.S. PATENT DOCUMENTS

2013/0013184 A1*  1/2013  Morotomi .............. G08G 1/163
                                                    701/301
2019/0152490 A1*  5/2019  Lan ................... B60W 30/0956
(Continued)

FOREIGN PATENT DOCUMENTS

DE     102018104270 A1     8/2019
DE     102020121865 A1     4/2021
(Continued)

OTHER PUBLICATIONS

German Office Action from counterpart DE1020241043601, dated Aug. 2, 2024.

*Primary Examiner* — Tuan C To

(57) ABSTRACT

A vehicle system includes at least one sensor configured to capture one or more images of a pedestrian positioned near a road, and a control module in communication with the at least one sensor. The control module is configured to determine one or more characteristics associated with the pedestrian positioned near to the road based on the one or more captured images, generate a trajectory prediction for the pedestrian, overlay the trajectory prediction for the pedestrian on a road segmentation of the road, and generate a road crossing prediction for the pedestrian based on the one or more characteristics and the overlayed trajectory prediction. The road crossing prediction forecasts whether the pedestrian will be on or off the road. Other example vehicle systems and methods for forecasting a future presence of a pedestrian on a road are also disclosed.

20 Claims, 6 Drawing Sheets

(51) Int. Cl.

| | |
|---|---|
| *B60W 30/095* | (2012.01) |
| *B60W 50/00* | (2006.01) |
| *B60W 50/14* | (2020.01) |
| *G06T 7/10* | (2017.01) |
| *G06T 7/70* | (2017.01) |
| *G06V 10/26* | (2022.01) |
| *G06V 10/70* | (2022.01) |
| *G06V 20/58* | (2022.01) |
| *G06V 40/10* | (2022.01) |

(52) U.S. Cl.

CPC ........ *B60W 50/0097* (2013.01); *B60W 50/14* (2013.01); *G06T 7/10* (2017.01); *G06T 7/70* (2017.01); *G06V 10/26* (2022.01); *G06V 10/70* (2022.01); *G06V 20/58* (2022.01); *G06V 40/10* (2022.01); *B60W 2050/146* (2013.01); *B60W 2420/403* (2013.01); *B60W 2554/4029* (2020.02); *B60W 2554/4045* (2020.02); *G06T 2207/20081* (2013.01); *G06T 2207/30196* (2013.01); *G06T 2207/30252* (2013.01)

(58) Field of Classification Search

CPC ........ G06V 20/58; G06V 10/70; G06V 40/10; G06V 10/26

USPC ......................................................... 701/301

See application file for complete search history.

(56) References Cited

U.S. PATENT DOCUMENTS

| | | | | |
|---|---|---|---|---|
| 2021/0124355 | A1* | 4/2021 | Kirigan | G05D 1/0214 |
| 2022/0171065 | A1* | 6/2022 | Li | G08G 1/164 |
| 2025/0128721 | A1* | 4/2025 | Lee | B60W 50/10 |

FOREIGN PATENT DOCUMENTS

| | | | |
|---|---|---|---|
| DE | 112020002666 T5 | 5/2022 | |
| EP | 3706034 A1 * | 9/2020 | G06N 7/01 |

* cited by examiner

400

VEHICLE SYSTEMS AND METHODS FOR PEDESTRIAN ROAD CROSSING PREDICTIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to pedestrian road crossing predictions, and more particularly to vehicle systems and methods for pedestrian road crossing predictions based on the integration of multiple sources.

Vehicles may be fully autonomous, semi-autonomous, or non-autonomous. When fully autonomous or semi-autonomous, a vehicle may include a driver assistance system that relies on sensors for blind spot detection, adaptive cruise control, lane departure warnings, etc. In some cases, the sensors may include radar devices (e.g., a long-range or a short-range radar device), cameras, etc. Data from the sensors be processed and analyzed to detect objects in the vicinity of the vehicle, and then utilized by the driver assistance system to control the vehicle.

SUMMARY

A vehicle system for a vehicle to forecast a future presence of a pedestrian on a road is disclosed. The vehicle system includes at least one sensor configured to capture one or more images of the pedestrian positioned near the road, and a control module in communication with the at least one sensor. The control module is configured to determine one or more characteristics associated with the pedestrian positioned near to the road based on the one or more captured images, generate a trajectory prediction for the pedestrian, overlay the trajectory prediction for the pedestrian on a road segmentation of the road, and generate a road crossing prediction for the pedestrian based on the one or more characteristics and the overlayed trajectory prediction. The road crossing prediction forecasts whether the pedestrian will be on or off the road.

In other features, the one or more characteristics associated with the pedestrian includes a crossing intention of the pedestrian indicative as to whether the pedestrian intends to cross the road.

In other features, the control module is configured to determine the crossing intention of the pedestrian with a machine learning module based on one or more behavior features associated with the pedestrian in the one or more captured images.

In other features, the one or more characteristics associated with the pedestrian includes a motion state estimation of the pedestrian indicative of whether the pedestrian is moving or not moving.

In other features, the control module is configured to determine the motion state estimation of the pedestrian with a machine learning module based on the one or more captured images.

In other features, the control module is configured to receive position data of the pedestrian to detect and locate the pedestrian, and the control module includes a prediction model configured to generate the trajectory prediction based on the position data.

In other features, the one or more characteristics associated with the pedestrian includes a motion state estimation of the pedestrian indicative of whether the pedestrian is moving or not moving, and the prediction model is configured to generate the trajectory prediction based on the motion state estimation of the pedestrian.

In other features, the control module is configured to generate the road crossing prediction based on whether the trajectory prediction overlaps at least a portion of the road.

In other features, the control module is configured to generate the road crossing prediction forecasting whether the pedestrian will be on or off the road for a period of time.

In other features, the vehicle system further includes a sensor configured to detect a velocity of the vehicle. The control module is configured to generate the road crossing prediction for the pedestrian based on the velocity of the vehicle.

In other features, the one or more characteristics associated with the pedestrian includes a crossing intention of the pedestrian indicative as to whether the pedestrian intends to cross the road and a motion state estimation of the pedestrian indicative of whether the pedestrian is moving or not moving. The control module is configured to generate the road crossing prediction forecasting that the pedestrian will be on the road only if the pedestrian intends to cross, the motion state estimation is moving, a velocity of the vehicle is below a defined threshold, and the trajectory prediction overlaps at least a portion of the road.

In other features, the one or more characteristics associated with the pedestrian includes a crossing intention of the pedestrian indicative as to whether the pedestrian intends to cross the road and a motion state estimation of the pedestrian indicative of whether the pedestrian is moving or not moving. The control module is configured to set confidence values for the crossing intention of the pedestrian, the motion state estimation of the pedestrian, and the trajectory prediction overlapping at least a portion of the road, and generate the road crossing prediction forecasting that the pedestrian will be on the road only if a sum of the confidence values exceeds a defined threshold.

In other features, the confidence values are weighted values.

In other features, the vehicle system further includes a vehicle control module in communication with the control module. The vehicle control module is configured to receive one or more signals from the control module indicative of the generated road crossing prediction.

In other features, the vehicle control module is configured to control at least one vehicle control system based on the one or more signals.

In other features, the vehicle control system includes an autonomous braking system.

A method for forecasting a future presence of a pedestrian on a road on which a vehicle is located is disclosed. The method includes determining one or more characteristics associated with the pedestrian positioned near to the road based on one or more images captured by at least one sensor, determining one or more characteristics associated with the pedestrian positioned near to the road based on the one or more captured images, generating a trajectory prediction for the pedestrian, overlaying the trajectory prediction for the pedestrian on a road segmentation of the road, and generating a road crossing prediction for the pedestrian based on the one or more characteristics and the overlayed trajectory prediction. The road crossing prediction forecasts whether the pedestrian will be on or off the road.

In other features, the one or more characteristics associated with the pedestrian includes a crossing intention of the pedestrian indicative as to whether the pedestrian intends to cross the road and a motion state estimation of the pedestrian indicative of whether the pedestrian is moving or not moving.

In other features, generating the road crossing prediction for the pedestrian includes generating the road crossing prediction forecasting that the pedestrian will be on the road only if the pedestrian intends to cross, the motion state estimation is moving, a velocity of the vehicle is below a defined threshold, and the trajectory prediction overlaps at least a portion of the road.

In other features, the method further includes setting confidence values for the crossing intention of the pedestrian, the motion state estimation of the pedestrian and the trajectory prediction overlapping at least a portion of the road, and generating the road crossing prediction for the pedestrian includes generating the road crossing prediction forecasting that the pedestrian will be on the road only if a sum of the confidence values exceeds a defined threshold.

In other features, the method further includes generating one or more signals indicative of the generated road crossing prediction, and controlling at least one vehicle control system based on the one or more signals.

In other features, the vehicle control system includes an autonomous braking system.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Autonomous vehicles include a driver assistance system that relies on sensors for vehicle control. The sensors (e.g., radar devices, cameras, etc.) provide data, which can be analyzed to detect the presence of objects and/or the future location of objects, such as pedestrians. Anticipating whether pedestrians will cross a road in which a vehicle is on in the near future is a critical aspect of autonomous (e.g., fully and semi-autonomous) driving. Such predictions, however, are complex and challenging due to, for example, scene comprehension, pedestrian-road interactions, pedestrian, and vehicle movements, etc.

The vehicle systems and methods according to the present disclosure accurately forecast whether a pedestrian will be on or off a road in the future. This may be achieved by combining information from multiple sources, such as estimated pedestrian characteristics, estimated pedestrian trajectories, vehicle characteristics, and road characteristics, as further explained below. Through the integration of such information, the vehicle systems and methods herein may forecast a pedestrian's future presence on a road (e.g., in a short time frame). In doing so, autonomous vehicles may quickly react based on the forecast, thereby altering the vehicle course (e.g., turning, braking, etc.) to avoid the pedestrian.

Figure 1:
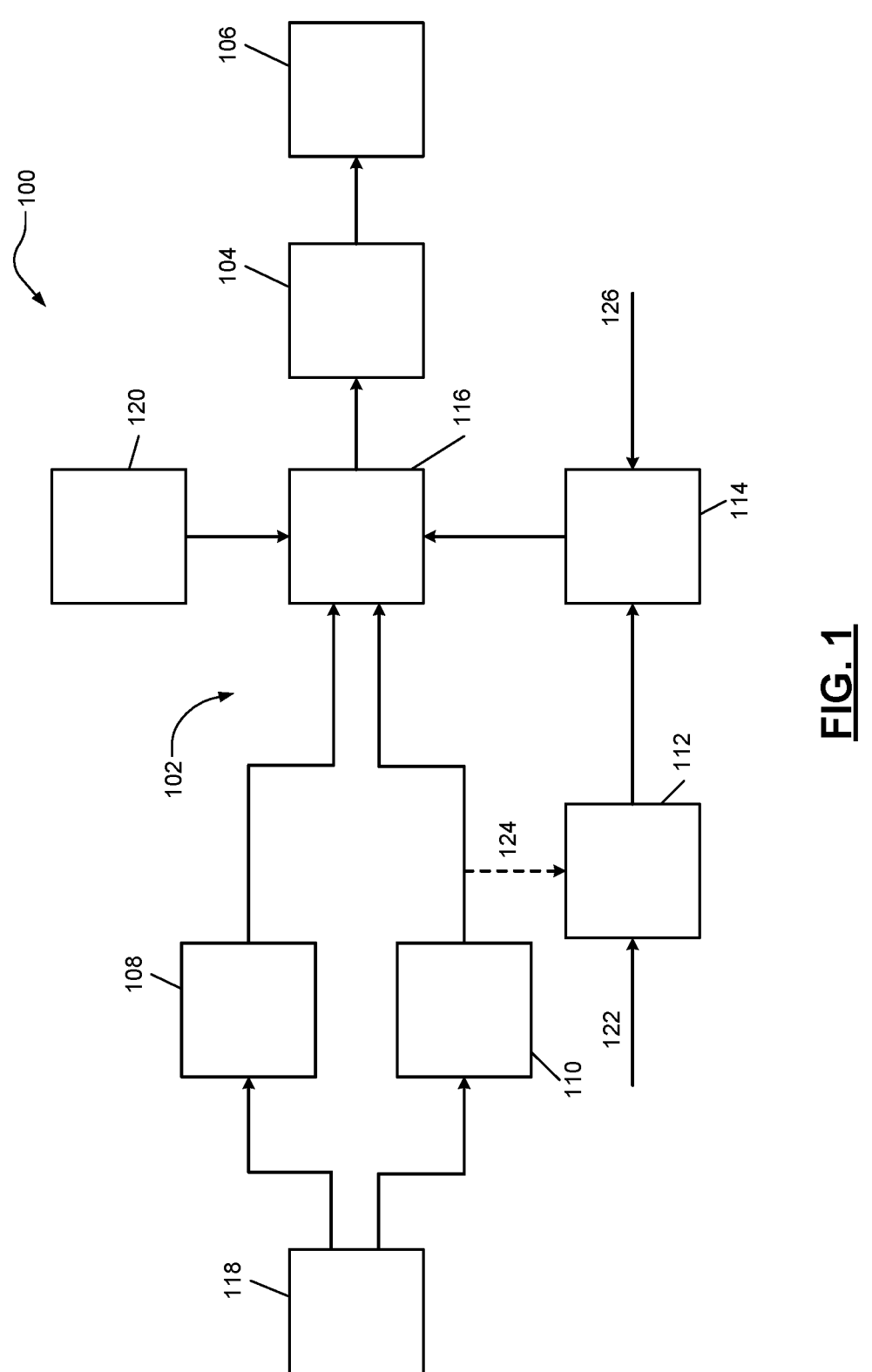
FIG. 1 is a block diagram of an example vehicle system for forecasting a future presence of a pedestrian on a road, according to the present disclosure.

Referring now to FIG. 1, a block diagram of an example vehicle system 100 is presented for a vehicle to forecast a future presence of a pedestrian on a road. For example, and as further explained below, the vehicle system 100 accurate predicts whether a person will be on a road in a future time interval (e.g., within the next 3 seconds, between 0.5 seconds and 2 seconds, between 1 second and 3 seconds, etc.).

As shown in FIG. 1, the vehicle system 100 generally includes a control module 102, a vehicle control module 104, one or more vehicle control systems 106, and various sensors. The control module 102 generally includes a crossing intention module 108, a motion state estimation module 110, a trajectory prediction module 112, a trajectory overlay module 114, and a road crossing prediction module 116. Although FIG. 1 illustrates the vehicle system 100 as including multiple separate modules, it should be appreciated that any combination of the modules (e.g., the control module 102, the vehicle control module 104, the modules in the control module 102, etc.) and/or the functionality thereof may be integrated into one or more modules.

The sensors of FIG. 1 may include one or more devices for capturing images of the environment around the vehicle and/or detecting or sensing vehicle parameters. For example, in the example of FIG. 1, the sensors may include one or more cameras 118 that capture a single frame (e.g., a single image) and/or multiple frames over time (e.g., video) of the environment around the vehicle. Additionally, the sensors may include a velocity sensor 120 for detecting a velocity of the vehicle. In such examples, the velocity sensor 120 may be an inertial measurement unit (IMU), a wheel speed sensor (WSS), a vehicle speed sensor (VSS) or another suitable sensor for generally detecting the velocity of the vehicle. As shown in FIG. 1, the sensors of FIG. 1 are in communication with the control module 102. For example, and as further explained below, the camera(s) 118 are in communication with the crossing intention module 108 and the motion state estimation module 110, and the velocity sensor 120 is in communication with the road crossing prediction module 116.

Although not shown in FIG. 1, the modules and sensors of the vehicle system 100 may share parameters via a network, such as a controller area network (CAN). In such examples, parameters may be shared via one or more data buses of the network. As such, various parameters may be made available by a given module and/or sensor to other modules and/or sensors via the network.

In various embodiments, the vehicle system 100 of FIG. 1 may be employable in any suitable vehicle, such as an electric vehicle (e.g., a pure electric vehicle, a plug-in hybrid electric vehicle, etc.), an internal combustion engine vehicle, etc. Additionally, the vehicle system 100 may be applicable to autonomous vehicles, including fully autonomous vehicles and semi-autonomous vehicles. For example, FIG. 2 depicts a vehicle 200 including the control module 102 and the vehicle control module 104 of FIG. 1, and one or more sensor 204 (e.g., one or more of the camera(s) 118 of FIG. 1, the velocity sensor 120 of FIG. 1, etc.) in communication with the control module 102.

With continued reference to FIG. 1, the control module 102 may determine one or more characteristics associated with the pedestrian positioned near or adjacent to the road. Such characteristics may be based on the one or more captured images from the camera(s) 118. In such examples, each camera 118 may capture one or more images of a pedestrian positioned near a road the vehicle is on (e.g., stopped on, parked, traveling, etc.) or is turning onto. The captured image(s) may be a single image or a video of any suitable duration (e.g., 0.2 seconds, 0.3 seconds, 0.4 seconds, 0.5 seconds, 0.6 seconds, 0.7 seconds, etc.).

Figure 2:
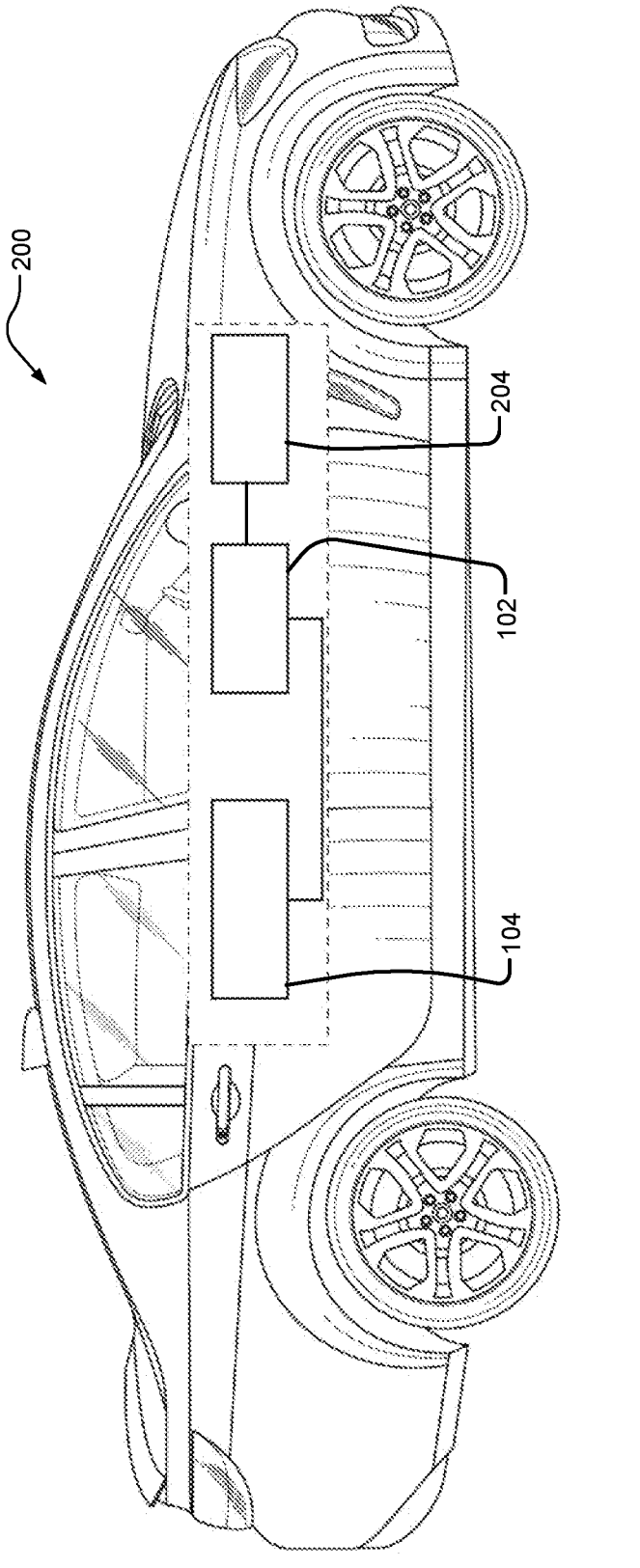
FIG. 2 is a vehicle including portions of the vehicle system of FIG. 1, according to the present disclosure.
Figure 3:
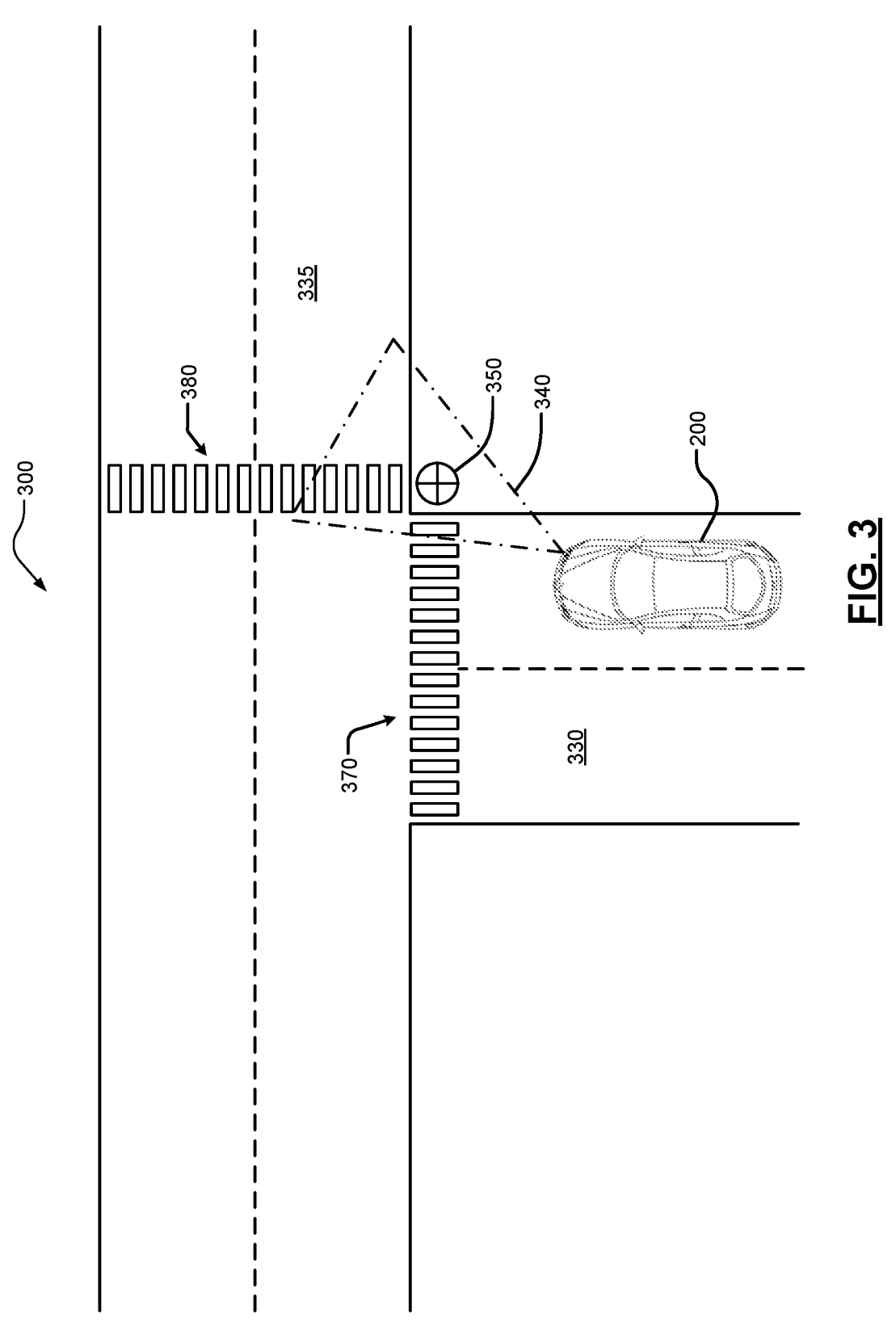
FIG. 3 is a block diagram of an example forecasting scenario in which the vehicle of FIG. 2 is approaching a crosswalk with a pedestrian standing nearby, according to the present disclosure.

For example, FIG. 3 depicts a block diagram of an example forecasting scenario 300 in which the vehicle 200 of FIG. 2 is traveling along a road 330 and approaching a crosswalk 370. In this example, the vehicle 200 may turn onto another road 335 having a crosswalk 380, as shown in FIG. 3. At least one camera on the vehicle 200 may capture one or more images of a pedestrian 350 positioned near the roads 330, 335. For instance, the camera may have a field of view 340 represented by lines having a dash-dot-dash configuration. In the example of FIG. 3, the pedestrian 350 may in the future begin moving across the road 330 (e.g., on or off the crosswalk 370) or across the road 335 (e.g., on or off the crosswalk 380).

In the example of FIG. 1, the one or more characteristics determined by the control module 102 may be any suitable predictive and/or estimated pedestrian attribute. For example, the control module 102 may determine a crossing intention of the pedestrian indicative as to whether the pedestrian intends to cross the road (e.g., the road 330, the road 335, etc.). In such examples, the crossing intention module 108 of the control module 102 receives the captured image(s) or data representative thereof from at least one of the cameras 118, generates a crossing intention of the pedestrian, and then outputs the crossing intention to the road crossing prediction module 116.

In such examples, the crossing intention represents what the pedestrian wants to do in the near future. For example, the crossing intention module 108 may determine whether the intention of the pedestrian is to cross the road or not cross the road. In such examples, the crossing intention module 108 can output a positive signal (e.g., a "1" or another suitable indicator) to the road crossing prediction module 116 if the determined intention is to cross and a negative signal (e.g., a "0" or another suitable indicator) to the road crossing prediction module 116 if the determined intention is to not cross.

In various embodiments, the crossing intention module 108 may determine the crossing intention of the pedestrian based on one or more behavior features associated with the pedestrian in the captured images. For example, the crossing intention module 108 may include or be in communication with a machine learning module (e.g., a neural network or another suitable machine learning module) that analyzes behavior features of the pedestrian (from the images) and then determines the crossing intention based on such features. In such examples, the machine learning module may be trained to discern between crossing and non-crossing intentions. For instance, labeled datasets may be generated based on one or more analysts reviewing input images (e.g., input video clips of 0.5 seconds, etc.). In such examples, the analysts may spot features/characteristics of pedestrians and their relation to the road and vehicle, such as a distance between a pedestrian and a road, whether the pedestrian's head is up or down, where the pedestrian is looking (e.g., towards the road, towards the vehicle, away from the road, etc.), whether the pedestrian's eyes are closed or open, etc.

Additionally, the one or more characteristics determined by the control module 102 of FIG. 1 may be a motion state estimation of the pedestrian. For example, the motion state estimation module 110 of the control module 102 receives the captured image(s) or data representative thereof from at least one of the cameras 118, generates an estimated motion state for the pedestrian, and then outputs the motion state to the road crossing prediction module 116. In such examples, the captured image(s) or data representative used by the motion state estimation module 110 may be the same or different image(s)/data as used by the crossing intention module 108.

In the example of FIG. 1, the motion state estimation represents the current state of the pedestrian. For example, the motion state estimation may fall into one of any two suitable categories. For instance, the motion state estimation may be indicative of whether the pedestrian is moving or not moving. In other examples, the motion state estimation may represent whether the pedestrian is walking (or running, etc.) and stationary (e.g., standing, sitting, etc.). Regardless of the categories, the motion state estimation module 110 may can output a positive signal (e.g., a "1" or another suitable indicator) to the road crossing prediction module 116 if the current pedestrian state falls into one category (e.g., moving) and a negative signal (e.g., a "0" or another suitable indicator) to the road crossing prediction module 116 if the current pedestrian state falls into another category (e.g., not moving).

In various embodiments, the motion state estimation module 110 may determine the pedestrian motion state with a machine learning module that analyzes behavior features of the pedestrian from the received images. For example, the motion state estimation module 110 may include or be in communication with a machine learning module (e.g., a neural network or another suitable machine learning module) that is trained to categorize a current pedestrian state. In such examples, the machine learning module for the motion state estimation module 110 may be trained according to labeled datasets generated based on one or more analysts reviewing input images (e.g., input video clips of 0.5 seconds, etc.). In such examples, the input images for training and/or the motion state determination may be cropped around a pedestrian's location to reduce processing requirements.

With continued reference to FIG. 1, the control module 102 may generate a trajectory prediction for the pedestrian. In such examples, the trajectory prediction may be determined with the trajectory prediction module 112 based on position data of the pedestrian. For example, in FIG. 1 the trajectory prediction module 112 receives a signal 122 indicative of the pedestrian's position. In some examples, the signal 122 may include object detection data for identifying and locating the pedestrian in a 3D or 2D environment based on various characteristics, such as the shape, location, orientation, etc. of the pedestrian. In other words, the trajectory prediction module 112 may receive 3D or 2D object detection data. In such examples, the 3D or 2D object detection may be accomplished through conventional techniques and based on inputs from one or more sensors on the vehicle (e.g., the camera(s) 118, radar sensors, lidar sensors, etc.).

In various embodiments, the trajectory prediction module 112 may generate the trajectory prediction using a prediction model that receives the pedestrian position data (e.g., the 3D or 2D object detection data) as input. For example, the trajectory prediction module 112 may include or be in communication with a Kalman filter or another suitable prediction model that predicts the next position of the pedestrian based on received position data (e.g., previous coordinates) of the pedestrian. Once generated, the trajectory prediction or data representative thereof may be output to the trajectory overlay module 114 as shown in FIG. 1.

In some examples, the trajectory prediction module 112 may optionally generate the trajectory prediction based on other inputs. For example, and as shown in FIG. 1, the trajectory prediction module 112 receives an input signal 124 from the motion state estimation module 110. In such examples, the input signal 124 may be the motion state estimation (e.g., a positive signal or a negative signal) output from the motion state estimation module 110 as explained above. Then, the trajectory prediction module 112 may generate the trajectory prediction based on the motion state estimation of the pedestrian. For example, the input signal 124 (e.g., the motion state estimation) may be employed as a control signal for the trajectory prediction module 112. In such examples, the trajectory prediction module 112 may only generate the trajectory prediction if the input signal 124 is positive (e.g., the pedestrian is moving). In other examples, the trajectory prediction module 112 may factor in the motion state estimation when generating the trajectory prediction. For example, the generated trajectory prediction may be different if the motion state of the pedestrian is moving as opposed to not moving.

The control module 102 of FIG. 1 may overlay the generated trajectory prediction from for the pedestrian on a road segmentation of the road. For example, and as shown in FIG. 1, the trajectory overlay module 114 receives the trajectory prediction from the trajectory prediction module 112 and an input signal 126 indicative of a road segmentation of the road the vehicle is on or is turning onto. In such examples, the road segmentation may be an image or a map.

In various embodiments, the overlay of the trajectory prediction may be achieved with a machine learning module. In such examples, the trajectory overlay module 114 may include or be in communication with the machine learning module (e.g., a neutral network or another suitable machine learning module) that is designed and trained for segmentation of road pixels on the received image or map that already contains road segmentations. For example, a received image (e.g., a satellite image) is segmented with respect to the road. In such examples, each pixel of the image has coordinates and may be classified as part of the road or not based on the coordinates. Then, the trajectory overlay module 114 overlays or superimposes the trajectory prediction (e.g., a determined area, arrow, etc.) onto the segmented image. In such examples, pixels of the trajectory prediction are placed over the pixels of the segmented image.

Then, the trajectory overlay module 114 determines if the trajectory prediction overlaps the road. For instance, after the trajectory prediction module 112 is overlayed onto the segmented image (or map), the trajectory overlay module 114 can determine whether any of the pixels of the trajectory prediction overlap pixels classified as part of the road, and then provide an output to the road crossing prediction module 116 indicative of this determination. For example, if any portion of the trajectory prediction pixels overlap the road pixels, the trajectory overlay module 114 may output a positive signal (e.g., a "1" or another suitable indicator) to the road crossing prediction module 116 to signify that the pedestrian trajectory is on the road. If, however, no portion of the trajectory prediction pixels overlap the road pixels, the trajectory overlay module 114 may output a negative signal (e.g., a "0" or another suitable indicator) to the road crossing prediction module 116 to signify that the pedestrian trajectory is not on the road. In other examples, the trajectory overlay module 114 may output the positive signal if a defined amount (e.g., a threshold) of the road pixels overlap with the trajectory prediction pixels and the negative signal if not.

With continued reference to FIG. 1, the control module 102 may then generate a road crossing prediction for the pedestrian forecasting whether the pedestrian will be on or off the road. For example, the road crossing prediction module 116 may generate the road crossing prediction indicating whether the pedestrian will be on or off the road. In various embodiments, the road crossing prediction module 116 may generate the road crossing prediction forecasting whether the pedestrian will be on or off the road for a period of time. In such examples, the road crossing prediction may indicate when the pedestrian will be on or off the road. For example, the road crossing prediction module 116 may determine that the pedestrian will be on the road at time X, between time Y and time Z, and/or at another future time interval. For instance, the road crossing prediction may indicate that the pedestrian will be on the road within 3 seconds. In other examples, the road crossing prediction may indicate that the pedestrian will be on the road at time t+T, where t is the current time (e.g., 0 seconds) or a later time (e.g., 0.5 seconds) and T is some time after t (e.g., 1.5 seconds, 2 seconds, 3 seconds, 3.5 seconds, etc.).

In various embodiments, the road crossing prediction module 116 may rely on multiple inputs to generate the road crossing prediction. In such examples, the road crossing prediction module 116 may utilize a comprehensive view of the scene/environment to understand a pedestrian-road interaction and obtain knowledge about both pedestrian and vehicle movements. For example, the road crossing prediction module 116 may generate the road crossing prediction based on at least the characteristics associated with the pedestrian and the overlayed trajectory prediction. In such examples, the road crossing prediction may be generated based on whether the trajectory prediction overlaps at least a portion of the road (e.g., as indicated by the trajectory overlay module 114).

Additionally, in some embodiments, the road crossing prediction module 116 may take in account the velocity of the vehicle when generating the road crossing prediction. For example, the road crossing prediction module 116 may receive the velocity of the vehicle from the velocity sensor 120 as shown in FIG. 1, and then generate the road crossing prediction based on the velocity. For instance, if the vehicle is traveling at a high rate (e.g., the velocity is greater than a threshold), the probability that the pedestrian will cross the road may be low. If, however, the vehicle is traveling at a low rate (e.g., the velocity is less than a threshold), the probability that the pedestrian will cross the road may be higher.

The control module 102 may generate the road crossing prediction forecasting that the pedestrian will be on the road based on different conditions. For example, the road crossing prediction module 116 of the control module 102 may generate the road crossing prediction forecasting that the pedestrian will be on the road (and in some cases at a possible period of time) only if the pedestrian intends to cross, the motion state estimation is moving, a velocity of the vehicle is below a defined threshold, and the trajectory prediction overlaps at least a portion of the road. In other words, it may be necessary for each input provided to the road crossing prediction module 116 to meet a certain condition. For example, the output from the crossing intention module 108 may be required to be positive (e.g., the pedestrian's intention is to cross), the output from the motion state estimation module 110 may be required to be positive (e.g., the pedestrian is moving), the velocity of the vehicle is less than a defined threshold (e.g., 6 m/sec, 5.5 m/sec, 5 m/sec, 4.5 m/sec, 4 m/sec, etc.), and the output from the trajectory overlay module 114 indicates that the pedestrian trajectory is on the road (e.g., the pedestrian trajectory overlaps the road).

In other examples, the road crossing prediction module 116 may generate the road crossing prediction forecasting that the pedestrian will be on the road if a majority of the inputs meet certain conditions. In such examples, if any three of the inputs meets certain conditions as explained above, the road crossing prediction forecasting that the pedestrian will be on the road may be generated. In some examples, specific ones of the inputs may be required to meet the conditions explained above. For example, if the three of the inputs meeting certain conditions include the pedestrian motion state of moving and the pedestrian trajectory being on the road, the road crossing prediction module 116 may generate the road crossing prediction forecasting that the pedestrian will be on the road.

In still other examples, the road crossing prediction module 116 may generate the road crossing prediction forecasting that the pedestrian will be on the road based on a scoring system. For example, the road crossing prediction module 116 may set or receive confidence values for the pedestrian's crossing intention (from the road crossing prediction module 116), the pedestrian's motion state estimation (from the motion state estimation module 110), the trajectory prediction overlapping at least a portion of the road (from the trajectory overlay module 114), and/or the velocity of the vehicle. Then, the road crossing prediction module 116 may generate the road crossing prediction only if a sum of the confidence values exceeds a defined threshold. In some examples, the confidence values may be weighted values if desired. In such examples, each confidence value associated with a particular input may be weighed based on its importance relative to the other inputs.

In various embodiments, the control module 102 of FIG. 1 may generate and transmit a signal indicative of the generated road crossing prediction to the vehicle control module 104. In such examples, the control module 102 may generate the signals to indicate forecasting that the pedestrian will be on the road and in some cases at a possible period of time as explained above. Once received, the vehicle control module 104 can generate one or more control signals for controlling the vehicle control system(s) 106 based on the road crossing prediction.

For example, the vehicle control module 104 may use the road crossing prediction signal to control driver assistance systems in the vehicle 200 of FIG. 2-3. In such examples, the driver assistance systems may include, for example, an autonomous braking system (e.g., autonomous emergency braking (AEB), etc.), assisted steering (e.g., assisted evasive steering, etc.), and/or any other suitable driver assistance system that may be employed to decelerate the vehicle, alter the direction of the vehicle, etc. In other examples, the vehicle control system(s) 106 may include pedestrian and/or driver notification systems. In such examples, the vehicle control module 104 may activate an alarm (e.g., an audible alarm, a visual alarm, etc.) inside and/or outside the vehicle in an attempt to warn the pedestrian and/or the driver of the vehicle.

Figure 4:
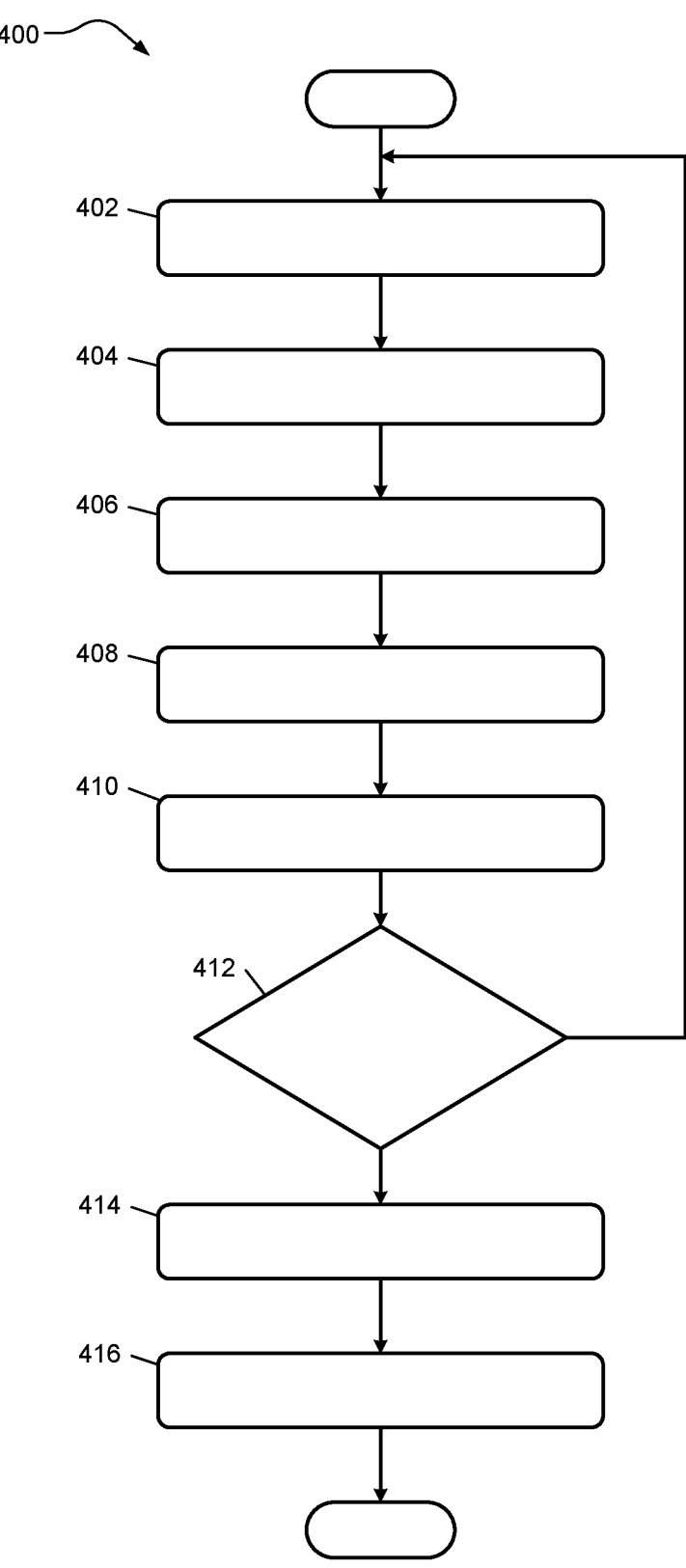
FIGS. 4-6 are flowcharts of example control processes for forecasting a future presence of a pedestrian on a road, according to the present disclosure.
Figure 5:
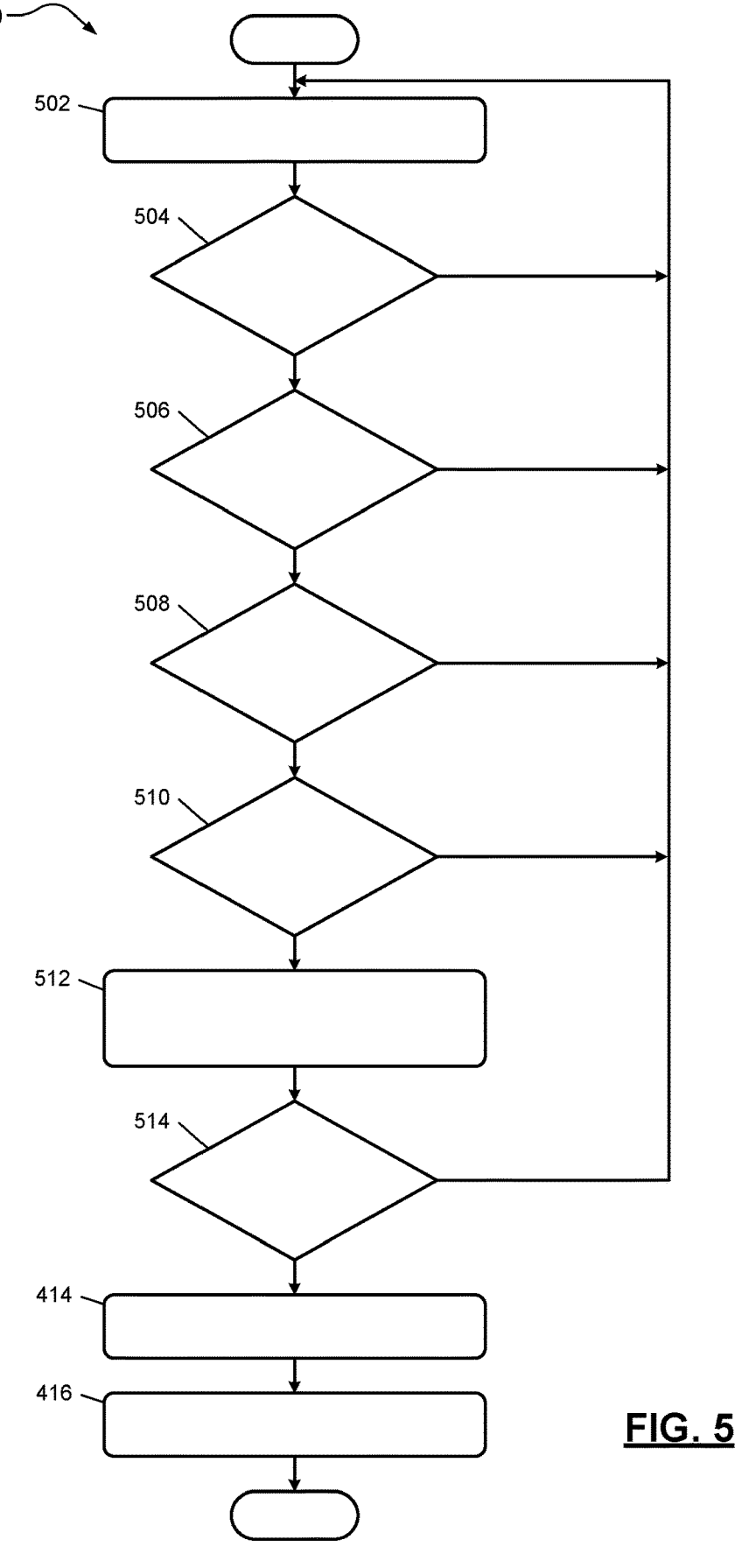
Figure 6:
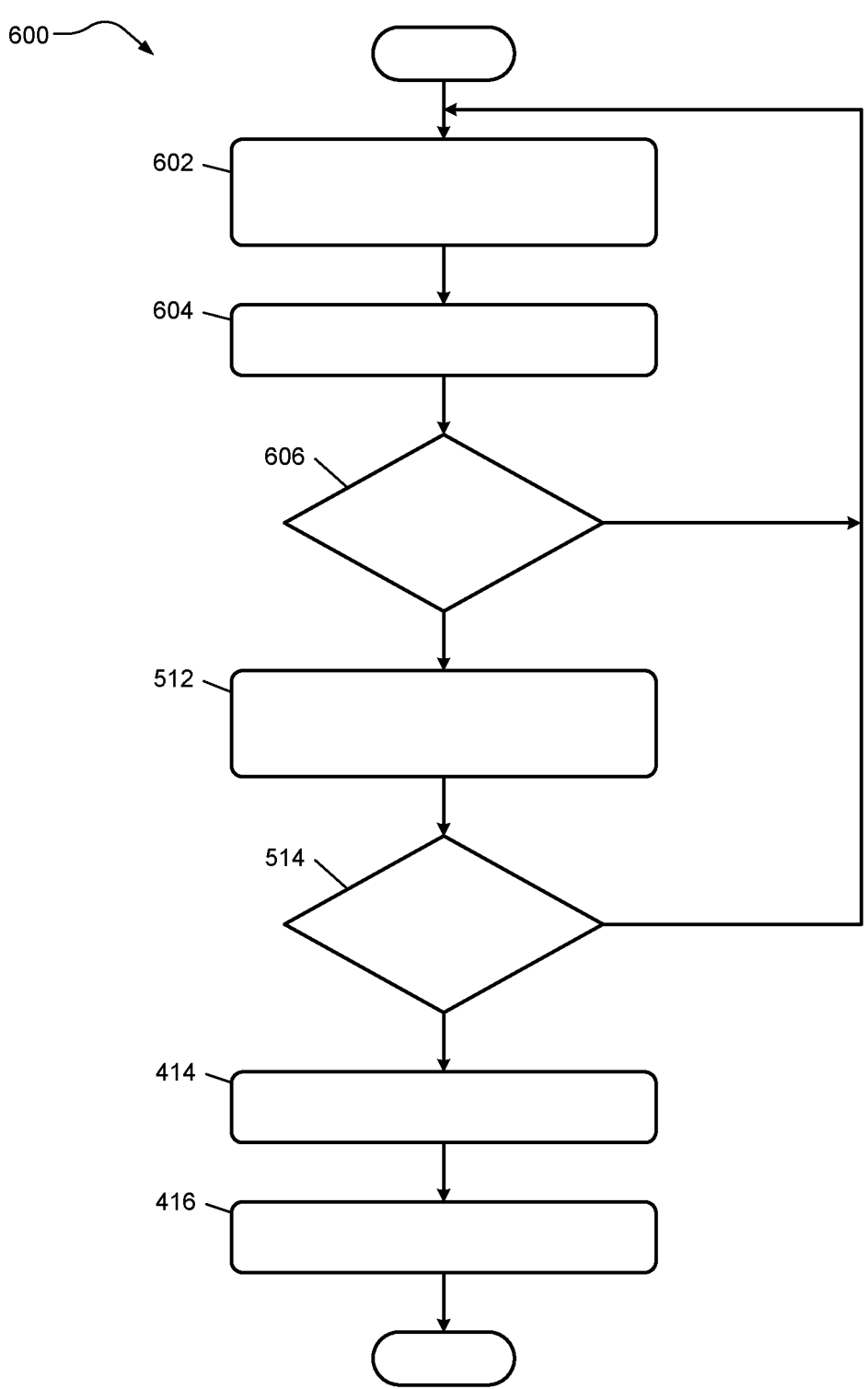

FIGS. 4-6 illustrate example control processes 400, 500, 600 for forecasting a future presence of a pedestrian on a road. In the examples of FIGS. 4-6, the control processes 400, 500, 600 may be implemented with the vehicle system 100 of FIG. 1 that is employable in the vehicle 200 of FIGS. 2-3. Although the example control processes 400, 500, 600 are described in relation to the vehicle system 100 of FIG. 1 including the control module 102, any one of the control processes 400, 500, 600 may be employable by another suitable vehicle system. Additionally, although the steps of the control processes 400, 500, 600 are shown and described below in a particular order, it should be appreciated that the steps of the control processes 400, 500, 600 may be implemented in another suitable order if desired. For example, the decisions steps of FIG. 5 may be implemented in a different order than shown.

As shown in FIG. 4, the control process 400 begins as 402 where the control module 102 receives one or more images. For example, and as explained above, the control module 102 receives (and more specifically, the crossing intention module 108 and the motion state estimation module 110) an image and/or a video (e.g., multiple frames or images) captured by one or more cameras on the vehicle 200. Control then proceeds to 404.

At 404, the control module 102 determines one or more characteristics associated with a pedestrian based on the received images. In various embodiments, the pedestrian characteristics may include, for example, a crossing intention of the pedestrian (e.g., the pedestrian's intention is to cross the road or not) and a motion state estimation of the pedestrian (e.g., moving or not moving), as explained above. In such examples, the crossing intention module 108 and the motion state estimation module 110 of FIG. 1 may generate the crossing intention and the motion state estimation, respectively, using separate machine learning modules (e.g., neural networks, etc.), as explained herein. Control then proceeds to 406.

At 406, the control module 102 generates a trajectory prediction for the pedestrian. For example, and as explained above, the trajectory prediction module 112 of the control module 102 may generate the trajectory prediction based on pedestrian position data (e.g., 3D or 2D object detection data). In some examples, the trajectory prediction may be generated with a Kalman filter or another suitable prediction model. Control then proceeds to 408.

At 408, the control module 102 overlays the generated trajectory prediction on a road segmentation of the road. In various embodiments, and as explained above, the overlay of the trajectory prediction may be achieved with a machine learning module (e.g., a neutral network, etc.) that is trained for segmentation of road pixels on an image or map that already contains road segmentations. For example, and as explained above, each pixel of the segmented image or map has coordinates and may be classified as part of the road or not based on the coordinates, and pixels of the trajectory prediction may be overlayed onto the pixels of the segmented image or map based on the coordinates. Control then proceeds to 410.

At 410, the control module 102 generates a road crossing prediction for the pedestrian forecasting whether the pedestrian will be on or off the road. In some examples, the road crossing prediction may be generated with the road crossing prediction module 116 of FIG. 1 based on at least the determined pedestrian characteristics and overlayed trajectory prediction, as explained herein. In other examples, additional inputs (e.g., a velocity of the vehicle 200) may be relied on when generating the road crossing prediction. Control then proceeds to 412.

At 412, the control module 102 determines whether the road crossing prediction indicates or forecasts that the pedestrian will be on the road at given time, such as on the road at time X, between time Y and time Z, and/or at another future time interval. If no, control returns to 402 as shown in FIG. 4. If yes, control then proceeds to 414.

At 414, the control module 102 generates a signal indicative of the generated road crossing prediction. In some examples, the control module 102 (e.g., the road crossing prediction module 116) may transmit the signal to a vehicle control module (e.g., the vehicle control module 104 of FIG. 1). Control then proceeds to 416, where a vehicle action is initiated based on the signal. For example, the vehicle control module or the control module 102 may generate a control signal for controlling one or more vehicle control systems based on the generated road crossing prediction, as explained above. Control may then end as shown in FIG. 4 or return to 402 if desired.

In FIG. 5, the control process 500 begins as 502 where the control module 102 receives a speed of the vehicle 200. For example, the road crossing prediction module 116 of the control module 102 may receive the speed (or data representative thereof) from the velocity sensor 120 of FIG. 1 or another suitable sensor associated with the vehicle 200. Control then proceeds to 404.

At 504, the control module 102 determines whether the velocity of the vehicle 200 is below a defined threshold. For example, and as explained above, the road crossing prediction module 116 may compare the velocity to any suitable threshold, such as 6 m/sec, 5.5 m/sec, 5 m/sec, 4.5 m/sec, 4 m/sec, etc. If the velocity is not less than the threshold at 504, control returns to 502. If, however, the velocity is less than the threshold at 504, control proceeds to 506.

At 506, the control module 102 determines whether a crossing intention indicates the pedestrian intends to cross the road. In such examples, the road crossing prediction module 116 may receive a signal from the crossing intention module 108 indicating that the pedestrian intends to cross or does not intend to cross. For example, and as explained above, the crossing intention module 108 may employ a machine learning module that analyzes behavior features of the pedestrian and then determines the crossing intention based on such features. If no at 506, control returns to 502. If yes at 506, control proceeds to 508.

At 508, the control module 102 determines whether a motion state of the pedestrian is moving. For instance, the road crossing prediction module 116 may receive a signal from the motion state estimation module 110 indicating pedestrian's current motion state. In such examples, the motion state estimation module 110 may employ a machine learning module that analyzes behavior features of the pedestrian and then determines the motion state based on the analysis, as explained above. The pedestrian's current motion state as determined by the motion state estimation module 110 may be moving (e.g., walking, running, etc.) or not moving (e.g., stationary, etc.). If no at 508, control returns to 502. If yes at 508, control proceeds to 510.

At 510, the control module 102 determines whether a trajectory prediction for the pedestrian overlaps onto the road. For instance, and as explained above, the trajectory prediction module 112 of the control module 102 may generate pedestrian's trajectory prediction based on, for example, 3D or 2D object detection data of the pedestrian.

Then, the trajectory overlay module 114 of the control module 102 may overlay the pedestrian's trajectory prediction onto a road segmentation of the road, as explained above. In such examples, the trajectory overlay module 114 may overlay the trajectory prediction (e.g., a determined area, arrow, etc.) onto the segmented image, and then determine whether any pixels of the trajectory prediction are placed over pixels for the road in the segmented image. If so, the trajectory prediction overlaps onto the road. If no at 510, control returns to 502. If yes at 510, control proceeds to 512.

At 512, the control module 102 generates a road crossing prediction for the pedestrian forecasting whether the pedestrian will be on or off the road. In some examples, the road crossing prediction may be generated with the road crossing prediction module 116 of FIG. 1 and include forecasted time frame in which the pedestrian is predicted to be on the road, as explained herein. For example, the road crossing prediction module 116 may forecast that the pedestrian will be on the road at given time, such as on the road at time X, between time Y and time Z, and/or at another future time interval.

Control then proceeds to 514, where the control module 102 determines whether vehicle action is needed. This determination may be made based on the road crossing prediction and other suitable inputs (e.g., the vehicle's speed, the vehicle's trajectory, etc. For example, the control module 102 may determine that the vehicle 200 will be away from a portion of the road in which the pedestrian is forecasted to be crossing at a given time. In such examples, the control module 102 may determine that vehicle action is not needed. In other examples, the control module 102 may determine that the vehicle 200 will be on a portion of the road in which the pedestrian is forecasted to be crossing at a given time. If so, the control module 102 may determine that vehicle action is needed. If no at 514, control returns to 502. If yes at 514, control then proceeds to 414, 416 as explained above relative to FIG. 4. Control may then end as shown in FIG. 5 or return to 502 if desired.

In various embodiments, the decision steps 504, 506, 508, 510 of FIG. 5 may function differently. For example, instead of returning to step 502 of FIG. 5 if a result is no, each decision step 504, 506, 508, 510 may proceed to the next step. Then, the road crossing prediction module 116 may generate the road crossing prediction at 512 forecasting that the pedestrian will be on the road if a majority of or particular ones of the decision steps 504, 506, 508, 510 result in a yes.

In FIG. 6, the control process 600 begins as 602 where the control module 102 sets values for various generated parameters. Specifically, the control module 102 sets a confidence value for the pedestrian's crossing intention (from the road crossing prediction module 116), a confidence value for the pedestrian's motion state estimation (from the motion state estimation module 110), a confidence value for the trajectory prediction overlapping at least a portion of the road (from the trajectory overlay module 114), and/or a confidence value for the velocity or speed of the vehicle. In such examples, the road crossing prediction module 116 of FIG. 1 may set the confidence values and/or receives the values from the road crossing prediction module 116, the motion state estimation module 110, the trajectory overlay module 114, and the velocity sensor 120. Additionally, in some examples, each confidence value associated may be weighed based on its importance, as explained above. Control then proceeds to 604.

At 604, the control module 102 combines the confidence values into a total value. This may be implemented by the road crossing prediction module 116 or another suitable module in FIG. 1. Control then proceeds to 606, where the control module 102 determines whether the total value (e.g., the combined confidence values) is greater than a defined threshold. For example, and as explained above, the road crossing prediction module 116 may compare the combined confidence values to any suitable threshold. If no at 606, control may return to 602 as shown in FIG. 6. In some examples, the road crossing prediction module 116 may generate a road crossing prediction forecasting that the pedestrian will not be on the road based before returning to 602. If yes at 606, control proceeds to 512, 514 as explained above relative to FIG. 5 and then 414, 416 as explained above relative to FIG. 4. Control may then end as shown in FIG. 6 or return to 602 if desired.

The systems and methods described herein accurately forecast whether a pedestrian will be on or off a road in the future based on information from multiple sources. For example, in various embodiments, the systems and methods may generate a road crossing prediction for a pedestrian forecasting whether the pedestrian will be on or off the road (e.g., crossing or not crossing the road) in 0.5 seconds to 2 seconds. In such examples, the road crossing accuracy may be 80.3% or higher, the non-crossing accuracy may be 92% or higher, and the balanced accuracy for both road crossing and non-crossing may be 86.6% or higher.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system for a vehicle to forecast a future presence of a pedestrian on a road, the vehicle system comprising:

at least one sensor configured to capture one or more images of the pedestrian positioned near the road; and a controller in communication with the at least one sensor, the controller configured to:

determine one or more characteristics associated with the pedestrian positioned near the road based on the one or more captured images, the one or more characteristics including a crossing intention of the pedestrian indicative as to whether the pedestrian intends to cross the road and a motion state estimation of the pedestrian indicative of whether the pedestrian is moving or not moving;

generate a trajectory prediction for the pedestrian;

overlay the trajectory prediction for the pedestrian on a road segmentation of the road;

set confidence values for the crossing intention of the pedestrian, the motion state estimation of the pedestrian, and the trajectory prediction overlapping at least a portion of the road; and generate a road crossing prediction forecasting that the pedestrian will be on the road only if a sum of the confidence values exceeds a defined threshold.

2. The vehicle system of claim 1, wherein the controller is configured to determine the crossing intention of the pedestrian with a machine learning module based on one or more behavior features associated with the pedestrian in the one or more captured images.

3. The vehicle system of claim 1, wherein the controller is configured to determine the motion state estimation of the pedestrian with a machine learning module based on the one or more captured images.

4. The vehicle system of claim 1, wherein:

the controller is configured to receive position data of the pedestrian to detect and locate the pedestrian; and the controller includes a prediction model configured to generate the trajectory prediction based on the position data.

5. The vehicle system of claim 4, wherein the prediction model is configured to generate the trajectory prediction based on the motion state estimation of the pedestrian.

6. The vehicle system of claim 1, wherein the controller is configured to generate the road crossing prediction forecasting whether the pedestrian will be on or off the road for a period of time.

7. The vehicle system of claim 1, further comprising a sensor configured to detect a velocity of the vehicle, wherein the controller is configured to generate the road crossing prediction for the pedestrian based on the velocity of the vehicle.

8. The vehicle system of claim 1, wherein the confidence values are weighted values.

9. The vehicle system of claim 1, further comprising a vehicle controller in communication with the controller, the vehicle controller configured to receive one or more signals from the controller indicative of the generated road crossing prediction.

10. The vehicle system of claim 9, wherein the vehicle controller is configured to control at least one vehicle control system based on the one or more signals.

11. The vehicle system of claim 10, wherein the vehicle control system includes an autonomous braking system.

12. A method for forecasting a future presence of a pedestrian on a road on which a vehicle is located, the method comprising:

determining one or more characteristics associated with the pedestrian positioned near to the road based on one or more images captured by at least one sensor, the one or more characteristics including a crossing intention of the pedestrian indicative as to whether the pedestrian intends to cross the road and a motion state estimation of the pedestrian indicative of whether the pedestrian is moving or not moving;

generating a trajectory prediction for the pedestrian;

overlaying the trajectory prediction for the pedestrian on a road segmentation of the road;

setting confidence values for the crossing intention of the pedestrian, the motion state estimation of the pedestrian, and the trajectory prediction overlapping at least a portion of the road; and generating a road crossing prediction forecasting that the pedestrian will be on the road only if a sum of the confidence values exceeds a defined threshold.

13. The method of claim 12, further comprising:

generating one or more signals indicative of the generated road crossing prediction; and controlling at least one vehicle control system based on the one or more signals.

14. The method of claim 13, wherein the vehicle control system includes an autonomous braking system.

15. A vehicle system for a vehicle to forecast a future presence of a pedestrian on a road, the vehicle system comprising:

at least one sensor configured to capture one or more images of the pedestrian positioned near the road; and a controller in communication with the at least one sensor, the controller configured to:

determine one or more characteristics associated with the pedestrian positioned near the road based on the one or more captured images, the one or more characteristics including a crossing intention of the pedestrian indicative as to whether the pedestrian intends to cross the road and a motion state estimation of the pedestrian indicative of whether the pedestrian is moving or not moving;

generate a trajectory prediction for the pedestrian;

overlay the trajectory prediction for the pedestrian on a road segmentation of the road; and generate a road crossing prediction forecasting that the pedestrian will be on the road only if the pedestrian intends to cross, the motion state estimation is moving, a velocity of the vehicle is below a defined threshold, and the overlayed trajectory prediction overlaps at least a portion of the road.

16. The vehicle system of claim 15, further comprising a vehicle controller in communication with the controller, the vehicle controller configured to receive one or more signals from the controller indicative of the generated road crossing prediction.

17. The vehicle system of claim 16, wherein the vehicle controller is configured to control at least one vehicle control system based on the one or more signals.

18. The vehicle system of claim 17, wherein the vehicle control system includes an autonomous braking system.

19. The vehicle system of claim 15, wherein the controller is configured to determine the crossing intention of the pedestrian with a machine learning module based on one or more behavior features associated with the pedestrian in the one or more captured images.

20. The vehicle system of claim 15, wherein the controller is configured to determine the motion state estimation of the pedestrian with a machine learning module based on the one or more captured images.

* * * * *